United States Patent
Togashi et al.

(10) Patent No.: US 11,017,537 B2
(45) Date of Patent: May 25, 2021

(54) IMAGE MONITORING SYSTEM

(71) Applicant: Hitachi Kokusai Electric Inc., Tokyo (JP)

(72) Inventors: Junichi Togashi, Tokyo (JP); Wataru Ito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 16/490,043

(22) PCT Filed: Apr. 28, 2017

(86) PCT No.: PCT/JP2017/017077
§ 371 (c)(1),
(2) Date: Aug. 29, 2019

(87) PCT Pub. No.: WO2018/198373
PCT Pub. Date: Nov. 1, 2018

(65) Prior Publication Data
US 2020/0043174 A1    Feb. 6, 2020

(51) Int. Cl.
*G06K 9/00*     (2006.01)
*H04N 7/18*     (2006.01)
*G06T 7/20*     (2017.01)

(52) U.S. Cl.
CPC ........... *G06T 7/20* (2013.01); *H04N 7/181* (2013.01); *G06T 2207/10016* (2013.01)

(58) Field of Classification Search
USPC ........ 382/103, 100, 104–107, 118, 114–115, 382/162, 172–173, 190, 199, 209, 219,
(Continued)

(56) References Cited

U.S. PATENT DOCUMENTS

2006/0018516 A1* 1/2006 Masoud ................ G06T 7/254
382/115
2010/0157049 A1* 6/2010 Dvir ................ G08B 13/19673
348/143
(Continued)

FOREIGN PATENT DOCUMENTS

JP    2009199322 A    9/2009
JP    2011049646 A    3/2011
(Continued)

OTHER PUBLICATIONS

International Search Report for International Application No. PCT/JP20171017077, dated Jul. 25, 2017 (with English translation).
(Continued)

*Primary Examiner* — Seyed H Azarian
(74) *Attorney, Agent, or Firm* — Greer, Burns & Crain, Ltd.

(57) ABSTRACT

An abandoned item detection unit detects an abandoned item shown in an image taken by any of a plurality of imaging devices. A person identification unit specifies the image directly before or directly after the appearance of the abandoned item as an image of abandonment timing, and identifies at least one person shown in the image of abandonment timing as a target person. A person search unit searches for an image showing the target person from among the images respectively taken by any of the plurality of imaging devices. A result display unit outputs a display showing the movement of the target person on the screen of a user terminal on the basis of the imaging device that has taken each image showing the target person and the imaging time at which each image showing the target person was taken.

6 Claims, 5 Drawing Sheets

(58) Field of Classification Search
USPC ....... 382/224, 232, 254, 176, 285–291, 305, 382/312; 707/722; 348/143; 705/7.42
See application file for complete search history.

(56) References Cited

U.S. PATENT DOCUMENTS

| | | | |
|---|---|---|---|
| 2013/0282446 A1* | 10/2013 | Dobell | G06Q 10/06398 705/7.42 |
| 2014/0112533 A1 | 4/2014 | Wang et al. | |
| 2015/0248751 A1 | 9/2015 | Ebiyama | |
| 2015/0254514 A1* | 9/2015 | Oami | G06K 9/00771 707/722 |
| 2018/0039745 A1* | 2/2018 | Chevalier | G16H 30/20 |

FOREIGN PATENT DOCUMENTS

| | | |
|---|---|---|
| JP | 2011061651 A | 3/2011 |
| JP | 2012222685 A | 11/2012 |
| JP | 2012235300 A | 11/2012 |

OTHER PUBLICATIONS

Written Opinion for International Application No. PCT/JP2017/017077, dated Jul. 25, 2017.

Sijun Lu et al.; "A Knowledge-Based Approach for Detecting Unattended Packages in Surveillance Video"; Proceedings of the IEEE Int'l. Conference on Video and Signal Based Surveillance; Nov. 1, 2006; pp. 1-6.

Jing-Ying Chang et al.; "Localized Detection of Abandoned Luggage"; EURASIP Journal on Advances in Signal Processing; vol. 2010, No. 1; Jan. 1, 2010; p. 675784.

Liu Xiya et al.; "An Abandoned Object Detection System Based on Dual Background and Motion Analysis"; Int'l. Conference on Computer Science and Service System; IEEE, Aug. 11, 2012; pp. 2293-2296.

Irfan Ahmed K Mohammed et al.; "Automated Surveillance of Unattended Bags for Complex Situations"; Int'l. Conference on Advances in Computing, Control, and Telecommunication Technologies; Dec. 28, 2009; p. 850-852.

Lu et al.; "Detecting unattended packages through human activity recognition and object association"; The Journal of the Pattern Recognition Society; vol. 40, No. 8; Apr. 17, 2007; pp. 2173-2184.

Supplemental EP Search Report issued in EP application No. 17 90 7868, dated Jul. 15, 2020.

* cited by examiner

IMAGE MONITORING SYSTEM

CROSS-REFERENCE TO RELATED APPLICATIONS

This application is a national stage application, filed under 35 U.S.C. § 371, of International Patent Application No. PCT/JP2017/017077 filed on Apr. 28, 2017, which is incorporated by reference herein in its entirety.

TECHNICAL FIELD

The present invention relates to an image monitoring system for monitoring images taken by imaging devices, and in particular to a system for identifying a person who has left an abandoned item and tracking the movement of the person.

BACKGROUND

In recent years, an image monitoring system has been arranged in facilities to which an unspecified large number of people visit such as airports, train station premises and shopping malls for the purpose of crime deterrence or accident prevention. Such image monitoring systems include an abandoned item detection system for detecting an abandoned item by monitoring images such as the system described in Japanese Unexamined Patent Publication 2011-61651, and a person search system for searching an identified person within images, such as the system described in Japanese Unexamined Patent Publication 2009-199322.

CITATION LIST

Patent Literature

Patent Literature 1: Japanese Unexamined Patent Publication 2011-61651
Patent Literature 2: Japanese Unexamined Patent Publication 2009-199322

SUMMARY

Technical Problem

Conventional abandoned item detection systems and person search systems have been used as individual systems and operated independently of each other. Therefore, it has been necessary for the user to work in accordance with the following procedures in order to identify the person who has left an abandoned item and track the movement of the person, for example.
(1) Confirm an alert issued from the abandoned item detection system (message for notifying the detection of an abandoned item).
(2) Replaying in reverse the stream of the images showing the abandoned item.
(3) Visually check the image at the point in time when the abandoned item was left so as to identify the person who had abandoned the item.
(4) Allow the person search system to carry out a person search where the person who had abandoned the item was designated as search key.
(5) Confirm the displayed results of the person search by the person search system.
In this manner, the prior art requires the user to visually confirm images and do the manual input work for a search, and therefore, it is not comfortable for the user to use the system, which is thus inconvenient, and lacks the real-time property.

The present invention is provided in view of the above-described conventional situation, and an object thereof is to provide an image monitoring system that makes it possible to reduce the burden on the user from the work for identifying a person who has left an abandoned item and tracking the movement of the person.

Solution to Problem

In order to achieve the above-described object, the image monitoring system or the image monitoring method according to the present invention are formed as follows.
(1) An image monitoring system having a plurality of imaging devices is characterized by being provided with: an abandoned item detection unit which detects an abandoned item shown in an image taken by any of the plurality of imaging devices; a person identification unit which specifies the image directly before or directly after the appearance of the abandoned item in the case where the abandoned item has been detected, and identifies at least one person who is shown in the specified image as a target person; a person search unit which searches for an image showing the target person from among the images respectively taken by the plurality of imaging devices; and a result display unit which outputs on a screen a display showing the movement of the target person on the basis of the imaging device that took each image showing the target person and an imaging time at which each image showing the target person was taken.
(2) The image monitoring system according to the above (1) is characterized in that the image monitoring system further comprises a personal feature value acquisition unit which acquires a personal feature value including a face feature value and a worn clothing feature value of the target person on the basis of the specified image, and the person search unit searches for the image showing the target person on the basis of the personal feature value.
(3) The image monitoring system according to the above (1) or (2) is characterized in that the result display unit outputs on the screen a display showing a route which the target person has moved on a map or a display showing images of the target person that are aligned in order of time series for each imaging device as the display showing the movement of the target person.
(4) The image monitoring system according to any of the above (1) through (3) is characterized in that the person identification unit identifies a person who is at the closest distance from the abandoned item as the target person in the case where a plurality of people have been detected from the specified image.
(5) The image monitoring system according to any of the above (1) through (3) is characterized in that the person identification unit identifies a person who is at a distance of a predetermined threshold value or less away from the abandoned item or several people who are at a closer distance than others as the target people in the case where a plurality of people are detected from the specified image.
(6) An image monitoring method is characterized by being provided with the steps of: detecting an abandoned item shown in an image taken by any of a plurality of imaging devices; specifying the image directly before or directly after the appearance of the abandoned item in the case where the abandoned item has been detected, and identifying at least one person shown in the specified image as a target person; searching for an image showing the target person from among the images respectively taken by the plurality of imaging devices; and outputting on a screen a display showing the movement of the target person on the basis of the imaging device that took each image showing the target person and an imaging time at which each image showing the target person was taken.

Advantageous Effects of the Invention

The present invention can provide an image monitoring system which makes it possible to reduce the burden on the user from the work of identifying a person who left an abandoned item and tracking the movement of the person.

DETAILED DESCRIPTION

In the following, the image monitoring system according to one embodiment of the present invention is described in reference to the drawings.

Figure 1:
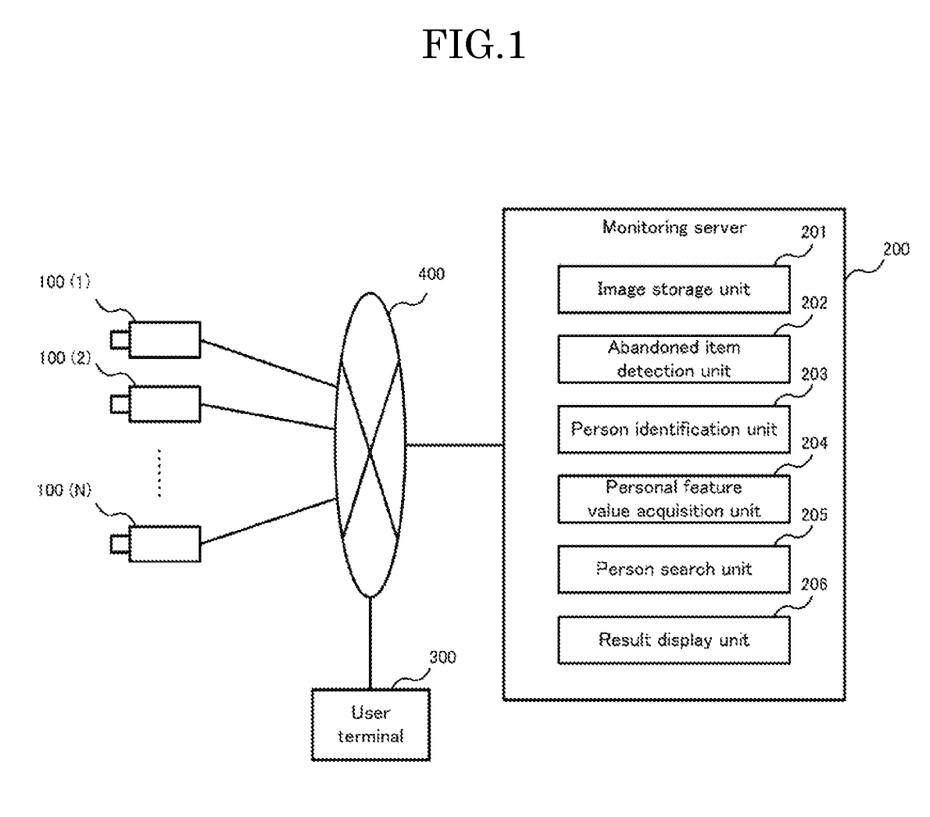
FIG. 1 is a diagram showing an example of the configuration of the image monitoring system according to one embodiment of the present invention.

FIG. 1 is a diagram showing an example of the configuration of the image monitoring system according to the embodiment of the present invention. The image monitoring system according to the present embodiment is provided with: a plurality (N) of imaging devices 100(1) through 100(N); a monitoring server 200; and a user terminal 300, and communication between these devices is established via a network 400. The image monitoring system is arranged in a facility to which an unspecified number of people visit such as an airport, train station premises or a shopping mall.

The network 400 is used for the exchange of signals or data between the respective devices. As for the network 400, a LAN (local area network), a WAN (wide area network), the Internet or any other form of a network can be used. The respective devices in the image monitoring system can communicate with another device via the network 400 by using a wired line, a wireless line or a combination of these.

The imaging devices 100(1) through 100(N) are devices such as IP cameras (network cameras) that are installed in the respective places within the facility where the image monitoring system is arranged. Each of the imaging devices 100 is provided with an imaging element such as a CCD (charge coupled device) or a CMOS (complementary metal oxide semiconductor) and carries out a digital conversion on the images that have been taken, which are transmitted to the monitoring server 200 via the network 400.

The user terminal 300 is a device used by the user (surveillant) in the present system. The user terminal 300 has a function of transmitting input data to the monitoring server 200 upon the reception of an input resulting from the operation by the user and a function of receiving the provided data transmitted from the monitoring server 200 so as to display the provided data on a screen. The user terminal 300 may be an installation-type device or a portable device such as a smartphone or a tablet, and thus, various types of devices can be used.

The monitoring server 200 is a server having a target person tracking function of identifying a person who has left an abandoned item (suspicious looking person, for example) as a target person on the basis of each video (images) taken by any of the plurality of imaging devices 100 and tracking the movement of the target person. The monitoring server 200 has as a process unit concerning the target person tracking function an image storage unit 201, an abandoned item detection unit 202, a person identification unit 203, a personal feature value acquisition unit 204, a person search unit 205 and a result display unit 206.

The image storage unit 201 carries out a process for storing images that have been transmitted from each of the plurality of imaging devices 100. The image storage unit 201 stores images that have been received from the imaging devices 100 in a randomly accessible recording medium such as an HDD (hard disc drive), for example. In addition, the attribution data such as the imaging device number for identifying the imaging device 100 that took an image and the imaging time at which the image was taken is attached to each image received from the imaging device 100, and these pieces of attribute data are also stored in the recording medium.

The abandoned item detection unit 202 carries out an abandoned item detection process for detecting an abandoned item shown in an image that had been taken by any of the plurality of imaging devices 100. In the abandoned item detection process, an abandoned item is detected, for example, through the comparison between an image that has been taken and a reference image that has been prepared in advance. Concretely speaking, the image that has been taken and the reference image are respectively binarized, and each pixel is differentiated between the binarized images. Next, a pixel region where the differential value is a predetermined threshold value or greater is sampled, and in the case where the sampled pixel region is a bundle having a predetermined size or greater, it is estimated that there is an abandoned item in this pixel region. In addition, the same process is repeated for the images that have been taken afterwards by the same imaging device 100. In the case where there is no change in the pixel region that has been estimated as an abandoned item even after a predetermined period of time has elapsed, it is determined that there is an abandoned item. That is to say, the item that is shown in the pixel region is detected as an abandoned item.

Here, it is preferable to detect a pixel region having a bundle of a predetermined size or greater as an abandoned item after carrying out an expansion/contraction process, a numbering process, a noise component removing process and the like on the sampled pixel region in order to increase the precision in the detection of an abandoned item. It is also preferable to prepare in advance a plurality of reference images having different brightness so as to select the reference image of which the brightness is the closest to the brightness of the image that has been taken before the comparison with the image that has been taken.

The person identification unit 203, in the case where an abandoned item is detected by the abandoned item detection unit 202, carries out an abandonment timing image specification process where an image at the moment when an abandoned item is placed is specified as an image of abandonment timing, and carries out a person identification process for identifying at least one person shown in the image of abandonment timing as a target person.

In the abandonment timing image specification process, an image of abandonment timing is specified by processing a sequence of images that have been received from the imaging device 100 that took the image from which an abandoned item was detected in the time series order or in the reverse order thereof.

For example, an image is specified at the point in time when an abandoned item was discovered (point in time when it was estimated that there was an abandoned item) by following the log in the abandoned item detection process, and images are processed by playing the stream of the images in reverse (towards the past) starting from this point in time. Thus, the image at the moment when the abandoned item disappears and the original backdrop image appears, that is to say, the image directly before the abandoned item was placed, is specified as the image of abandonment timing.

In another example, in the case where it has been confirmed that there was no abandoned item at the past point in time that is backdated by a certain period of time, the images are processed by following the stream of images in the forward direction (toward the future) starting from this point in time. Thus, the image at the moment where the original backdrop image disappeared and the abandoned item appeared, that is to say, the image directly after the abandoned item has been placed, is specified as the image of abandonment timing.

In the person identification process, first, a person detection process is carried out on the image of abandonment timing so as to detect a person shown in the image of abandonment timing. The person detection process can be carried out by using an arbitrary technique, and for example, a publicly-known face recognition technology can be used. In the case where only one person is detected, the person is identified as the target person. In the case where a plurality of people are detected, the distance between the place of the abandoned item and the place of each person in the image of abandonment timing is calculated, and the person whose calculated distance is the shortest is identified as the target person. Alternatively, a person whose calculated distance is a predetermined threshold value or less is identified as a target person, or several people whose calculated distance is shorter than others are identified as target people.

The location of the abandoned item is the location that represents the image region of the abandoned item in the image of abandonment timing. For example, the coordinates of the center of the image region of the abandoned item can be used. The location of a person is the location that represents the image region of the person in the image of abandonment timing. For example, the coordinates of the center of the image region of the entirety of the person, the coordinates of the center of the image region of the head or the face, the coordinates of the center of the image region of the hand that is closer to the abandoned item, or the like can be used.

There are some cases in the abandonment timing image specification process where the moment when the abandoned item was placed cannot be captured, and the image of abandonment timing cannot be specified. Such a situation occurs because the scene where the abandoned item was placed could not be shot when another person came between the abandoned item and the imaging device at the time, for example, when the area was crowded in such a manner that people overlapped in the image. In order to deal with such a situation, in the case where the image of abandonment timing cannot be specified in the person identification process, the person who is shown together with the abandoned item for the longest period of time is identified as the target person. Concretely, the period of time during which a person is shown together with the abandoned item is calculated for each person who is shown together with the abandoned item from the images before the abandoned item was detected, and the person whose calculated period of time is the longest is identified as the target person. Alternatively, a person whose calculated period of time is a predetermined threshold value or greater is identified as a target person or several people whose calculated period of time is longer than other are identified as target people.

The personal feature value acquisition unit 204 carries out a personal feature value acquisition process for acquiring a personal feature value on the basis of the image showing a person. In the present example, whenever an image is received from an imaging device 100, the personal feature value of the person who is shown in the received image is acquired. The personal feature value acquisition unit 204 makes the acquired personal feature value correspond to the image from which it was acquired when storing it in the image storage unit 201. A plurality of personal feature values is made to correspond to an image showing a plurality of people. In addition, the personal feature value acquisition unit 204 acquires the personal feature value of a target person on the basis of the image of abandonment timing that had been specified by the person identification unit 203. The personal feature value of the target person is used as a search key to search for a person in the person search unit 205.

The personal feature value is a value that represents the features of a person included in an image. In the present example, the personal feature value includes at least a facial feature value that indicates the features of a face or a worn clothing value that indicates the features of the worn clothing (including a hat, a carried item, accessories and the like). The facial feature value can be acquired by digitizing the contour and direction of the face, the color of the skin, the size/the shape/the positional relationship and the like of the main components of the face (eyes, nose, mouth and the like). The worn clothing feature value can be acquired by estimating the positions of the head, the upper body, the lower body and the like of a person, and digitizing the color, the shape and the like of the clothing worn by the person (a hat, a jacket, trousers, a carried item and accessories, for example). The facial feature value and the worn clothing feature value can be acquired by using an arbitrary technique and by using a technique that is disclosed in Patent Literature 1, for example.

The person search unit 205 carries out a person search process for searching for an image showing a target person from among the images that have been taken by each of the plurality of imaging devices 100 on the basis of the personal feature value of the target person that has been acquired on the basis of the image of abandonment timing specified by the person identification unit 203. In the person search process, for example, the personal feature value acquired for a target person is compared with the personal feature value acquired from another image so as to calculate the similarity. In the case where the similarity is a predetermined threshold value or greater, it is determined that the image shows the target person. In the present example, the person search process includes a past search where a search process is carried out on the images within the image storage unit 201 by going backward from the present time and a real-time search where a search process is carried out on the images that are transmitted from the imaging devices 100 afterwards.

The result display unit 206 carries out a tracking result display process for outputting on the screen of the user terminal 300 the display showing the movement of a target person on the basis of the search results by the person search unit 205. The movement of the target person can be tracked on the basis of the imaging device number and the imaging time that are made to correspond to each image of the search results. For example, the order in which the imaging device numbers are aligned can be specified in the case where the respective search result images are sorted in the order of the imaging time so as to track that a target person has moved through the areas where the image was taken by an imaging device 100 in the order that corresponds to the specified order of the aligned imaging device numbers. An example of the display of the information that indicates the movement of a target person (results of the tracking of a target person) is described below.

Figure 2:
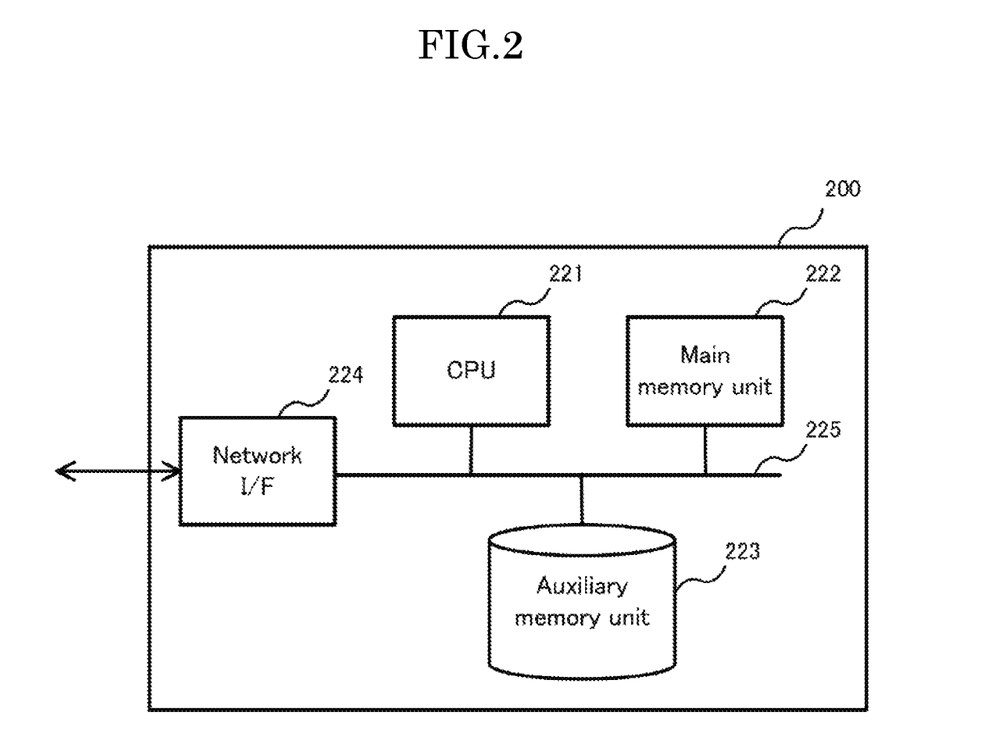
FIG. 2 is a diagram showing an example of the hardware configuration of the monitoring server shown in FIG. 1.

FIG. 2 shows an example of the hardware configuration of the monitoring server 200. The monitoring server 200 is formed of, for example, a CPU (central processing unit) 221, a main memory unit 222, an auxiliary memory unit 223 and a network interface (I/F) 224 that are linked through a bus 225.

The CPU 221 controls the respective units in the monitoring server 200 and runs a program for making various functions work in accordance with the present invention. The main memory unit 222 is implemented by a semiconductor device such as a DRAM (dynamic random access memory), which is an intermediating memory for loading and storing a program that is to be run by the CPU 221. The auxiliary memory unit 223 is implemented by an HDD or a flash memory, which is a memory of which the capacity is larger than that of the main memory unit 222 and which stores various types of data or programs. The network I/F 224 is an interface for receiving images that have been transmitted from the imaging devices 100, for receiving various types of input data that have been transmitted from the user terminal 300, for transmitting various types of supply data to the user terminal 300 and the like via the network 400.

The monitoring server 200 in the present example is formed in such a manner that the programs that prescribe the operations of the above-described respective process units 202 through 206 are stored in the auxiliary memory unit 223 and uploaded to the main memory unit 222 in order to be run in the CPU 221, and thus, the respective process unit 201 through 206 are realized. Here, part of the entirety of the process units 201 through 206 may be realized with a dedicated hardware circuit instead of being realized by the software as described above.

Figure 3:
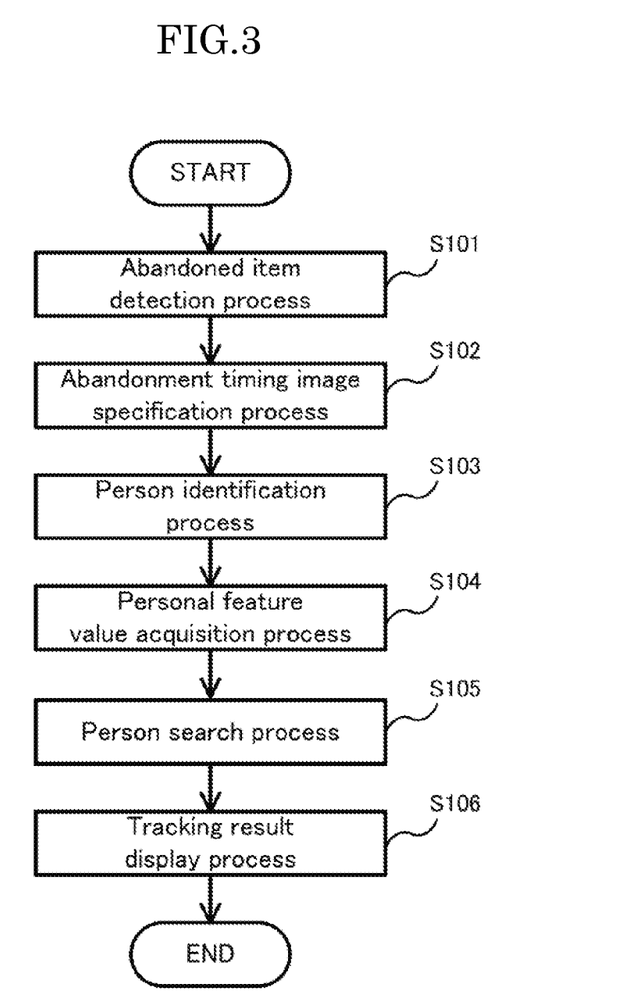
FIG. 3 is a flow chart showing an example of the process flow where a target person is tracked by the monitoring server shown in FIG. 1.

FIG. 3 is a flow chart showing an example of a process flow for tracking a target person by means of the monitoring server 200.

The monitoring server 200 allows the abandoned item detection unit 202 to carry out an abandoned item detection process (step S101). The abandoned item detection process is carried out whenever an image is received from an imaging device 100 or whenever the received image is stored in the image storage unit 201.

Upon the detection of an abandoned item, the monitoring server 200 issues a message to that effect to the user terminal 300 so as to let the user at the user terminal 300 know of the detection of an abandoned item. In addition, the monitoring server 200 allows the person identification unit 203 to carry out an abandonment timing image specification process so as to specify the image at the moment when the abandoned item was placed as an image of abandonment timing (step S102). Next, the monitoring server 200 allows the person identification unit 203 to carry out a person identification process so as to identify at least one person shown in the image of abandonment timing as a target person (step S103).

Next, the monitoring server 200 allows the personal feature value acquisition unit 204 to carry out a personal feature value acquisition process so as to acquire a personal feature value of the target person (step S104). Next, the monitoring server 200 allows the person search unit 205 to carry out a person search process on the basis of the personal feature value of the target person so as to search for images showing the target person (step S105). Next, the monitoring server 200 allows the result display unit 206 to carry out a track result display process so as to display information showing the movement of the target person on the screen of the user terminal 300 (step S106).

Here, the respective processes in step S102 through step S106 may be carried out after waiting for the instruction from the user who has confirmed the message to the effect that an abandoned item has been detected or immediately after the detection of an abandoned item.

In the case where a plurality of target people is identified in step S103, the processes in steps S104 through S106 may be repeated for the respective target people or may be carried out on any of the target people. In the case where the processes are carried out on any of the target people, the identified plurality of target people may be shown to the user at the user terminal 300 so that the user can select a target person from among them.

Next, an example of the display of the results of the tracking of a target person (an example of the display by means of the result display unit 206) is described.

Figure 4:
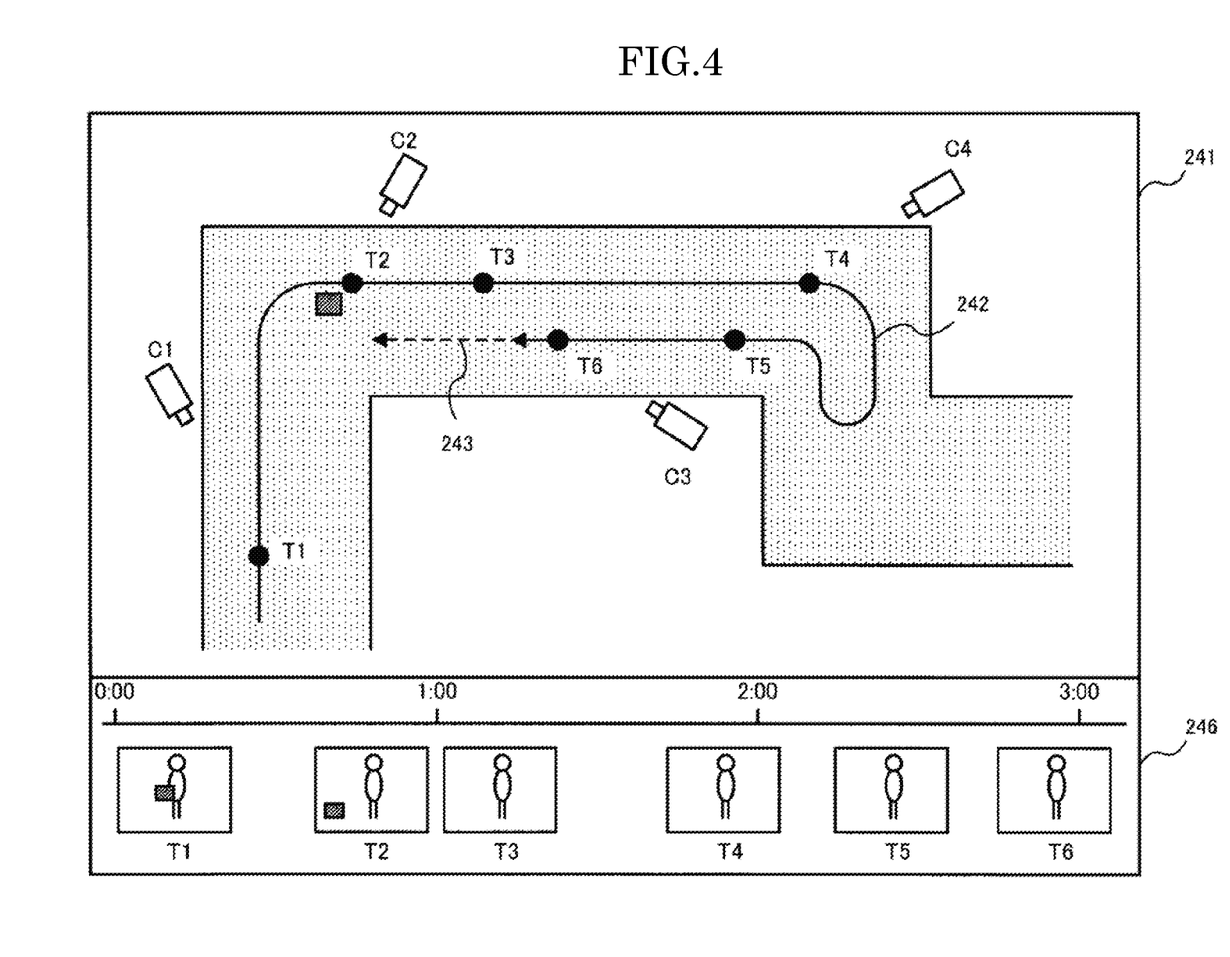
FIG. 4 is a diagram showing an example of the display of the tracking results of a target person.

FIG. 4 shows an example of the display of the results of the tracking of a target person. The example of the display in FIG. 4 has a map display region 241 showing the route which the target person has moved on a map, and a timeline display region 246 showing respective images of the target person that are aligned chronologically.

The map display region 241 shows places C1 through C4 at which an imaging device is arranged, and points T1 through T6 at which the target person is shown on a map of the area that includes the places C1 through C4 at which an imaging device that has taken an image of the target person are arranged. In order to realize the display of such a map, the map within the facility where the present system is arranged and the places (C1 through C4) at which an imaging device is arranged within the facility may be stored in advance. As a result, the place at which the imaging device that has taken an image of the target person is arranged can be specified from the imaging device numbers that are attached to the images showing the target person so as to be displayed on the map.

In addition, the timeline display region 246 displays the images that have been taken at the respective points (T1 through T6) that are aligned chronologically.

Furthermore, the map in the map display region 241 shows a route 242 which the target person has moved in such a manner that the route 242 overlaps the map. The route 242 can be estimated on the basis of the coordinates of the respective points (T1 through T6), the time at which the target person has passed by each point (time at which the image was taken), and the general walking speed that has been preset. The route 242 is estimated by the result display unit 206 in the present example. The route 242 is estimated on the basis of the search results gained from the search in the past by the person search unit 205. The following route 243 of the target person may be added on the basis of the search results gained from the following real time search. Furthermore, a route which the target person will highly likely pass through afterwards may be expected on the basis of the past and present routes 242 and 243, and thus, a function of displaying a future route may be provided.

Figure 5:
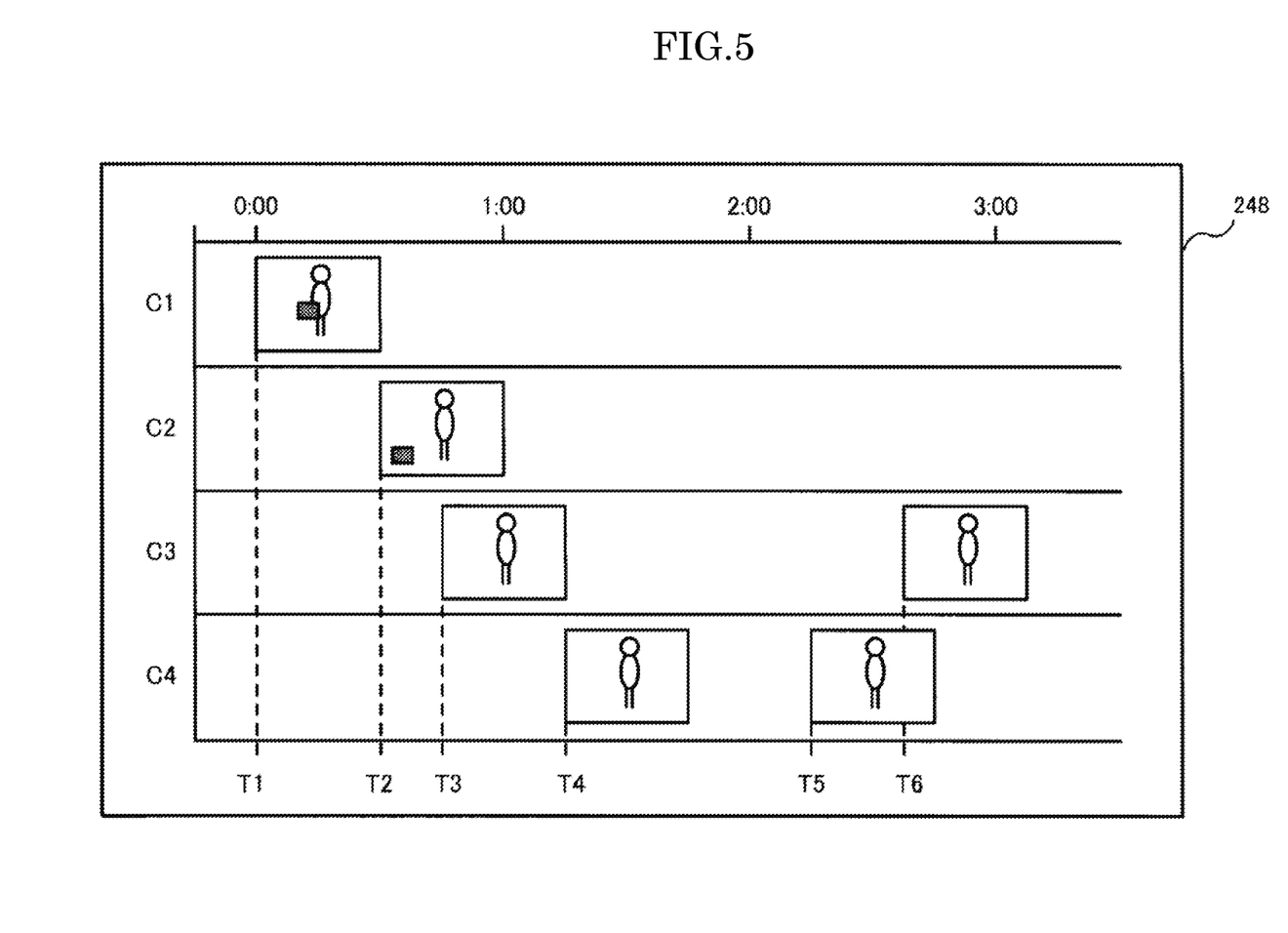
FIG. 5 is a diagram showing another example of the display of the tracking results of a target person.

FIG. 5 shows another example of the display of the results of the tracking of a target person. The example of the display in FIG. 5 has a timeline detail display region 251 showing images of a target person that are aligned chronologically for each imaging device. The timeline detail display region 251 is gained by dividing the timeline display region 246 in the first example of the display (FIG. 4) for the respective imaging devices.

In the present example, it is preset which display between the display in FIG. 4 or the display in FIG. 5 is to be used; however, it may be possible for the user at the user terminal 300 to be allowed to select the display, or the switching of the display may be made possible when instructed by the user. In addition, the timeline detail display region 251 in FIG. 5 may be used instead of the timeline display region 246 in FIG. 4.

As described above, the image monitoring system in the present example is configured in such a manner that: the abandoned item detection unit 202 detects an abandoned item that is shown in an image taken by any of the plurality of imaging devices 100; in the case where an abandoned item is detected, the person identification unit 203 specifies the image directly before or directly after the appearance of the abandoned item as an image of abandonment timing, and identifies at least one person shown in the image of abandonment timing as a target person; the person search unit 205 searches for an image showing the target person from among the images respectively taken by any of the plurality of imaging devices 100; and the result display unit 206 outputs the display showing the movement of the target person on the screen of the user terminal 300 on the basis of the imaging device that has taken each image showing the target person and the imaging time at which each image showing the target person was taken. Accordingly, the image monitoring system in the present embodiment makes it possible to automate the processes from the detection of an abandoned item to the tracking of the movement of a target person, and therefore, the burden of the user who has to monitor within a facility can be reduced, and a target person can be efficiently tracked in real time.

The image monitoring system in the present example is further provided with a personal feature value acquisition unit 204 for acquiring a personal feature value that includes a facial feature value and a worn clothing feature value of a target person on the basis of the image of abandonment timing, and thus is configured in such a manner that the person search unit 205 searches for an image showing a target person on the basis of the personal feature value of the target person. Therefore, the image monitoring system in the present example allows for a search by using not only the facial feature value of a target person, but also a worn clothing feature value, which makes it possible to search for other images showing the target person from the clothing or the like worn by the person even in the case where the image of abandonment timing does not clearly show the face of the target person.

In addition, the image monitoring system in the present example is configured in such a manner that the result display unit 206 outputs on the screen the display showing a route which a target person has moved on a map or the display showing the images of the target person that are aligned chronologically for each imaging device as the display showing the movement of the target person. Accordingly, the image monitoring system in the present example makes it possible for the user at the user terminal 300 to easily confirm the target person who has left an abandoned item (including a suspicious person who has intentionally abandoned the item or a person who has unintentionally left or lost the item) and the movement of the person.

Furthermore, the image monitoring system in the present example is configured in such a manner that the person identification unit 203 identifies a target person on the basis of the length of the period of time a person is shown together with the abandoned item in the case where an image of abandonment timing cannot be specified. Accordingly, the image monitoring system in the present example can identify as a target person a person who highly likely left an abandoned item even in the case where an image of abandonment timing cannot be specified.

Here, the contents of the above-described processes by the respective processing units 201 through 206 are mere examples, and the various functions according to the present invention may be achieved by using other techniques.

For example, the results of a person search may include not only images showing a target person, but also images showing other people, and in the case where the number of images of the other people is large, it is possible for the personal feature value used for the person search to be inappropriate. That is to say, it is assumed that the features that differentiate the target person from other people are not exhibited in the space of the feature value in the case where the search results include many images of other people. Therefore, several weighing patterns where the weight given to each element of the clothing feature value (hat, jacket, trousers, carried item, accessories and the like) is differentiated may be prepared so that the respective weighing patterns are applied to the trials of a person search in order to automatically select the weighing pattern that makes it easy to distinguish the resulting target person from other people. The following method can be applied as an example of such a pattern selection method. Each weighing pattern is applied for a trial of a person search, and the number of times that each person has been searched for in each trial is recorded. Here, it can be said that the probability of a person who has been searched for a large number of times being the target person is high. Next, a predetermined number of people who have been searched for many times is selected in the order of the number of times of being searched. These people are referred to as the candidate people for the target person. Next, the weighing pattern where the candidate people have been searched for the greatest number of times from among the search results is selected from the respective weighing patterns. This weighing pattern is a weighing pattern that provides a high probability of a target person being included many times, and thus provides a great weight to the feature value that contributes to the differentiation between the target person and other people while providing a small weight to the feature value that does not contribute to the differentiation. This weighing pattern can be used to increase the precision of a person search. In addition, a weighing pattern that includes a large number of candidate people can be used to exclude people who clearly seem unlikely to be a target person at the stage before the target person is identified instead of using only one weighing pattern to finally determine the target person. That is to say, a logical multiplication process can be carried out on the search results, for example, in order to increase the probability of a target person being included, and thus, the candidates for a target person can be narrowed down through the exclusion of unlikely candidates from the search results.

In the case where the face of a target person is not clearly shown in the image of abandonment timing, an image of the same person that clearly shows the face may be selected from among the images covering several time frames before and after the image of abandonment timing that have been taken by the same imaging device, and then, a facial feature value (and a worn clothing feature value) may be acquired from this image. Here, whether or not the person in the images is the same can be determined from the positional relationships of the image region of the person between the images (frames), the similarity of the worn clothing feature value of the person between the images and the like.

Here, the configurations of the system and the devices according to the present invention may not necessarily be limited to those in the above, and various configurations may be used.

In addition, it is possible for the present invention to provide a method or a system according to which the processes according to the present invention are carried out, a program for implementing such a method or system, a recording medium for storing such a program, or the like.

INDUSTRIAL APPLICABILITY

The present invention can be applied to an image monitoring system for monitoring images taken by imaging devices.

The invention claimed is:

1. An image monitoring system having a plurality of cameras and a server, wherein the server performs:
   an abandoned item detection process which detects an abandoned item shown in an image taken by any of the plurality of cameras;
   a person identification process which, in the case where the abandoned item has been detected, processes a sequence of images received from the camera that has taken the image from which the abandoned item has been detected in reverse order of time series from a point in time when the abandoned item was discovered so as to specify the image directly before the abandoned item had been placed, or processes the sequence of images in order of time series from a past point in time where it is clear that there is no abandoned item so as to specify the image directly after the abandoned item had been placed, and identifies at least one person shown in the specified image as a target person;
   a person search process which searches for an image showing the target person from among the images respectively taken by the plurality of cameras;
   a result display process which outputs on a screen a display showing the movement of the target person on the basis of the camera that took each image showing the target person and an imaging time at which each image showing the target person was taken; and
   a personal feature value acquisition process which acquires a personal feature value including a face feature value and the worn clothing feature value of the target person on the basis of the specified image, wherein the person search process searches for the image showing the target person on the basis of the personal feature value, and
   wherein, the person search process has a plurality of weighing patterns where a weight given to each element of a clothing feature value is differentiated, the person search process executing the trials of the search by applying the respective weighing patterns, selecting the weighing pattern that makes it easy to distinguish the resulting target person from other people, and executing the search by applying the selected weighing pattern,
   wherein the result display process outputs on the screen a display showing a route which the target person has moved on a map or a display showing images of the target person that are aligned in order of time series for each camera as the display showing the movement of the target person, and displays a route which the target person passes thereafter, which is predicted on the basis of a past route which the target person had moved or a present route which the target person is moving.

2. The image monitoring system according to claim 1, wherein the person identification process identifies a person who is at the closest distance from the abandoned item as the target person in the case where a plurality of people have been detected from the specified image.

3. The image monitoring system according to claim 1, wherein the person identification process identifies a person who is at a distance of a predetermined threshold value or less away from the abandoned item or several people who are at a closer distance than others as the target people in the case where a plurality of people are detected from the specified image.

4. The image monitoring system according to claim 1, wherein the person identification process identifies a person who is shown together with the abandoned item for the longest period of time is identified as the target person in the case where a plurality of people have been detected from the specified image.

5. The image monitoring system according to claim 1, wherein in the case where the face of the target person is not shown in the specified image, the person identification process selects an image of the same person that clearly shows the face from among the images several frames before or after the specified image that have been taken by the same camera in order to acquire a facial feature value.

6. An image monitoring method performed by a server comprising the steps of:
   detecting an abandoned item shown in an image taken by any of a plurality of cameras;
   processing a sequence of images received from the camera that has taken the image from which said abandoned item has been detected in reverse order of time series from a point in time when the abandoned item was discovered in order to specify the image directly before the time when the abandoned item had been placed, or processing the sequence of images in order of time series from a past point in time where it is clear that there was no abandoned item in order to specify the image directly after the time when the abandoned item was placed, and identifying at least one person shown in the specified image as a target person;
   acquiring a personal feature value including a face feature value and a worn clothing feature value of the target person on the basis of a specified image, wherein the person search process searches for the image showing the target person on the basis of the personal feature value,
   searching for an image showing the target person from among the images respectively taken by the plurality of cameras; and outputting on a screen a display showing the movement of the target person on the basis of the camera that took each image showing the target person and an imaging time at which each image showing the target person was taken, and outputting on the screen a display showing a route which the target person has moved on a map or a display showing images of the target person that are aligned in order of time series for each camera as the display showing the movement of the target person, and displaying a route which the target person passes thereafter, which is predicted on the basis of a past route which the target person had moved or a present route which the target person is moving, wherein, a plurality of weighing patterns where the weight given to each element of a clothing feature value is differentiated are prepared, and the searching step executes the trials of the search by applying the respective weighing patterns, selects the weighing pattern that makes it easy to distinguish the resulting target person from other people, and executes the search by applying the selected weighing pattern.

\* \* \* \* \*